J. HAWKINS.
Steam-Plow.
No. 25,826.  Patented Oct. 18, 1859.
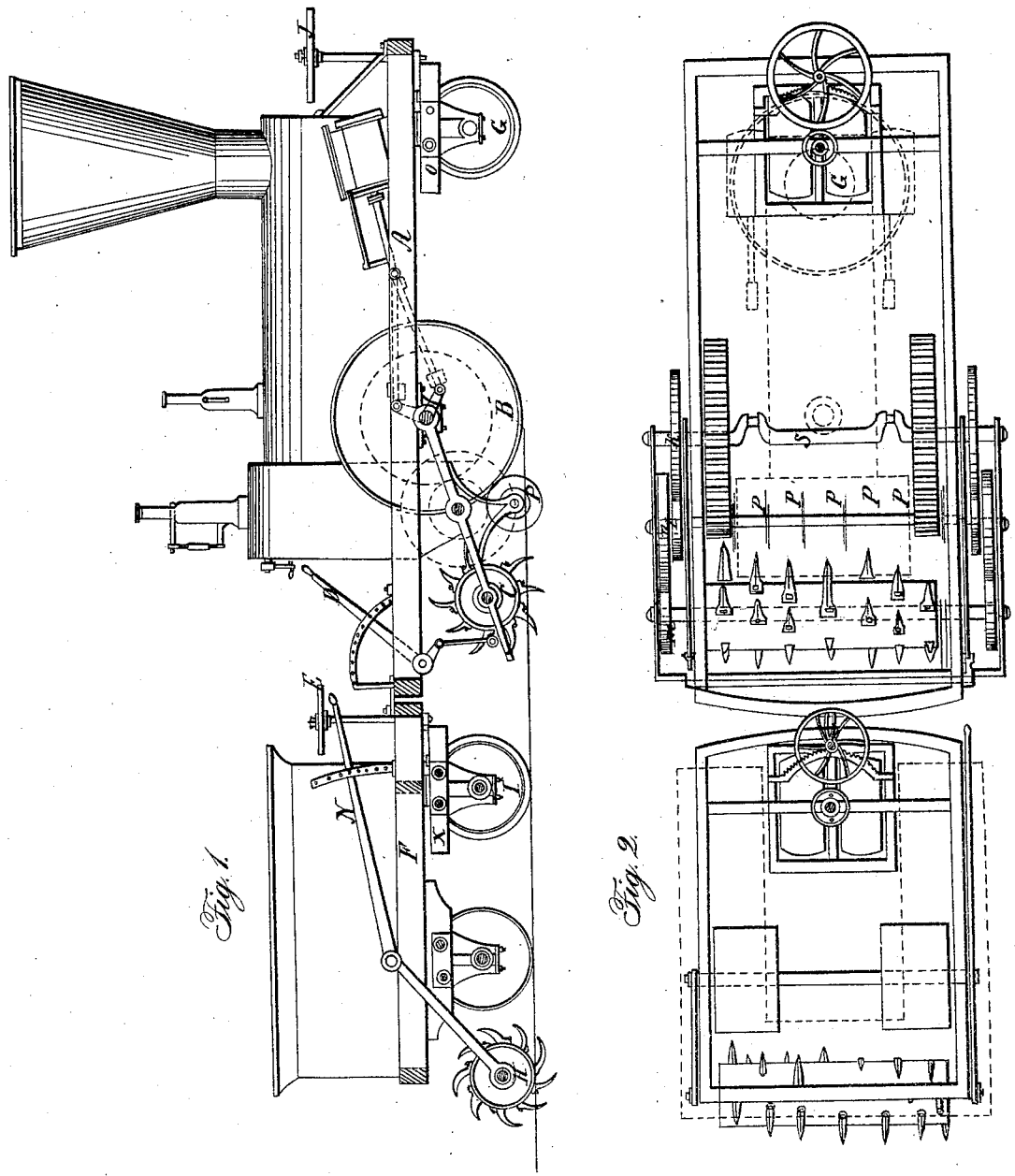
Witnesses:  Inventor:

UNITED STATES PATENT OFFICE.

JAMES HAWKINS, OF WILKINS, PENNSYLVANIA.

IMPROVEMENT IN STEAM-PLOWS.

Specification forming part of Letters Patent No. 25,826, dated October 18, 1859.

*To all whom it may concern:*

Be it known that I, JAMES HAWKINS, of Wilkins township, Allegheny county, Pennsylvania, have invented a new and Improved Mode of Plowing by Steam; and I hereby declare that the following is a full and exact description thereof, reference being had to the accompanying drawings, and to the letters of reference marked thereon.

My invention acts on the principle of a lever instead of a screw or inclined plane, as many other inventions do. It also has a shaft with circular knives P on it to cut or separate the sod before the teeth act upon it. The common plow used acts upon the principle of sliding friction, while this is propelled by rolling friction, and instead of one driver used in other inventions, this has two. It would also have this advantage over inventions with which a plow is connected, of the ordinary kind, that it leaves the subsoil loose as it found it, while the pressure of the old-fashioned plow upon the subsoil hardens it. The power in this is attached to the driver between the driver and boiler, while in other inventions the power is attached on the outside of the driver.

The wheels on the frame O control the motion and direction of the whole machine by means of lever J, which operates a rack and pinion, and thereby the caster-wheels G.

To keep the tail end of the plow in the course of digger C, the frame X is guided by the lever E, attached to a rack and pinion, to control the motion of the machine either forward or backward or in a curve.

The front cylinder (marked C) is connected with the driver B by means of cogs $m$ $n$ L K, (see Fig. 2,) so as to give cylinder C a greater velocity. The driving-wheels B are mounted on and revolved with crank-shaft S. The cylinder C can be raised or lowered by means of lever D, connected with a crank-shaft attached to the hind part of frame A. The teeth are to be placed in such a position that they may run from one end of the cylinder to the other in a curved line, so that the strain upon the teeth may be uniform.

The tail end of the machine is the cylinder, (marked H,) connected with a tender by a frame with a lever, N, attached, so as that it may be raised or lowered. It operates something like a roller with sharp bent knives, so as to cut and pulverize the lumps or soil and level the ground.

The length, thickness, and strength of the teeth and knives must be regulated to correspond with the power of the machine.

What I claim as new, and desire to secure by Letters Patent, is—

The arrangement of the frames A and F, levers J and E, caster-wheels G and I, drivers B, crank-shaft S, cutter P, toothed cylinders C and H, levers D and N, operating conjointly, as set forth, for the purposes specified.

JAMES HAWKINS.

Attest:
I. A. YOUNG,
JAMES McCLEARY.